Figure 1:
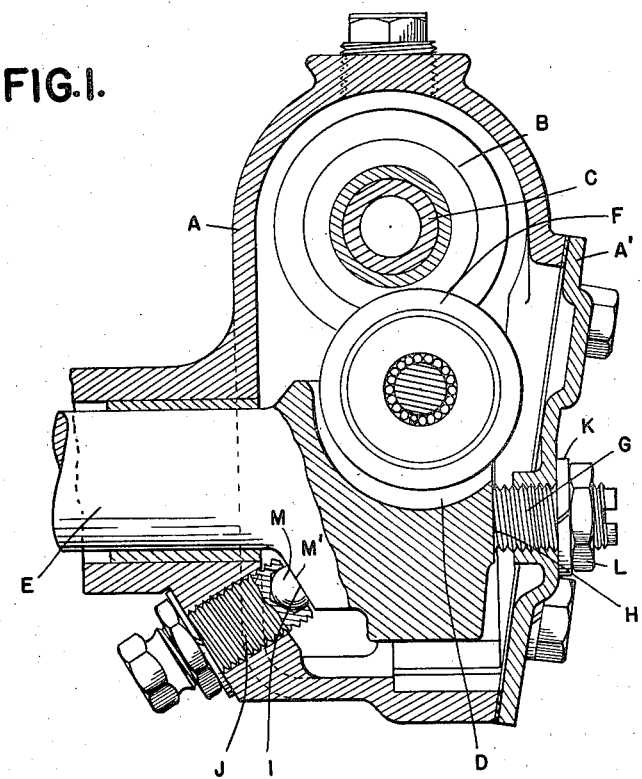

March 16, 1937.  H. MARLES  2,073,971
ADJUSTMENT MEANS FOR STEERING GEARS
Filed May 25, 1936

INVENTOR
HENRY MARLES
BY *Whittemore Hulbert & Belknap*
ATTORNEYS

Patented Mar. 16, 1937

2,073,971

UNITED STATES PATENT OFFICE 2,073,971

ADJUSTMENT MEANS FOR STEERING GEARS

Henry Marles, Detroit, Mich., assignor to Gemmer Manufacturing Company, Detroit, Mich., a corporation of Michigan Application May 25, 1936, Serial No. 81,752

4 Claims. (Cl. 74—401)

The invention relates to steering gears of that type including a worm gear between the steering stem and the rockshaft, both the worm and the worm gear being journaled in bearings in fixed relation to each other. Adjustment between the gears is effected by an axial movement of the worm gear with respect to the worm, said gear having its teeth obliquely inclined to the plane of rotation so that such movement will cause them to approach or recede from the worm. It is the object of the present invention to provide an exceedingly simple means for effecting such axial adjustment and for locking against accidental displacement. To this end, the invention consists in the construction as hereinafter set forth.

In the drawing:

Figure 1 is a cross-section through the housing for the worm gearing showing my improved adjustment means;

A is the housing for the gearing in which is placed the worm B mounted on a steering stem C and the worm gear D mounted on the rockshaft E. As shown, the worm gear is of the type having a roller tooth F which can be caused to approach or recede from the worm by an axial movement of the shaft E.

With certain constructions that have heretofore been used, this axial adjustment is effected by a screw threaded member having a swivel axial engagement with the rockshaft and a threaded engagement with the housing. With the present invention such swivel connection is dispensed with, the construction being as follows.

G is a set screw engaging a threaded bearing in the housing, preferably in the detachable cover A' of said housing. This is located to be slightly eccentric to the axis of the rockshaft E and so as to engage a segmental bearing H on the end thereof. On the opposite side of the worm wheel there is formed on the rockshaft and surrounding the same, a segmental bearing I which is obliquely inclined to the axis of the shaft. This segmental bearing is engaged by a second set screw J which has a threaded engagement with the housing and is inclined to be substantially normal to the segment. Both set screws G and J are provided with lock washers K and lock nuts L for holding them in each position of adjustment. The set screw J is also provided with a spherical recess in its end in which is placed a member M having a spherical portion for engaging said recess and a flattened portion M' for engaging the segmental bearing I. This avoids the necessity of great accuracy in the placing of the set screw J and insures a full bearing upon the segment I.

With the construction as described, after the gearing has been assembled in the housing A, the set screws G and J are adjusted so as to move the roller tooth F into full engagement with the worm. This is preferably accomplished by first adjusting the set screw G so as to tightly press the roller tooth against the worm and then giving a slight clearance by the reverse rotation of said set screw a predetermined amount. The set screw J can then be adjusted and relieved in a similar manner and both set screws locked by the washers K and lock nuts L. The construction is, therefore, exceedingly simple and inexpensive to manufacture, while it provides for accurately adjusting and holding the worm and gear in operative relation to each other.

What I claim as my invention is:

1. In a steering mechanism, the combination with a housing, of a worm and worm gear journaled in fixed bearings in said housing and of a construction in which the teeth are moved towards or from each other by an axial adjustment of one of said members, and means for effecting such axial adjustment comprising set screws engaging segmental bearings on opposite sides of the adjustable member, said set screws also engaging threaded bearings in said housing, and means for locking said set screws in different positions of adjustment.

2. In a steering mechanism, the combination with a housing, of a worm and worm gear journaled in fixed bearings in said housing and of a construction in which the teeth are moved towards or from each other by an axial adjustment of one of said members, and means for effecting such axial adjustment comprising a set screw for engaging a segmental bearing at the end of the adjustable member, an oppositely facing segmental bearing on said adjustable member inclined to the axis of rotation thereof, a set screw engaging the latter bearing and normal thereto both of said set screws having threaded bearings in said housing and operable from outside thereof, and means for locking said set screws in each position of adjustment.

3. In a steering mechanism, the combination with a housing, of a worm and worm gear journaled in fixed bearings in said housing and of a construction in which the teeth are moved towards or from each other by an axial adjustment of the worm gear with respect to the worm, of means for effecting said axial adjustment comprising segmental bearings on opposite sides of said worm gear, one of said bearings being inclined to the axis of rotation and set screws normal to the respective bearings and having a threaded engagement with said housing permitting of adjustment of the same from outside the housing, and locking means for said set screws in each position of adjustment.

4. In a steering mechanism, the combination with a housing, of a worm and worm gear journaled in fixed bearings in said housing and of a construction in which the teeth are moved towards or from each other by an axial adjustment of the worm gear with respect to the worm, of means for effecting said axial adjustment comprising segmental bearings on opposite sides of said worm gear, one of said bearings being inclined to the axis of rotation and set screws normal to the respective bearings and having a threaded engagement with said housing, the set screw for the inclined bearing having a segmental spherical socket in the end thereof, a shoe member universally pivotal in said spherical socket and engaging said inclined segmental bearing, and means for locking said set screws in each position of adjustment.

HENRY MARLES.